F. KIRSCHKE.
ROTARY HARROW.
APPLICATION FILED APR. 23, 1920.
1,418,933.
Patented June 6, 1922.
4 SHEETS—SHEET 3.
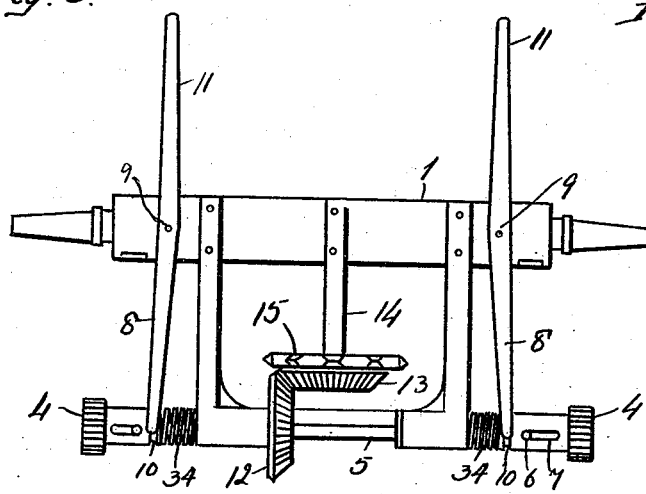
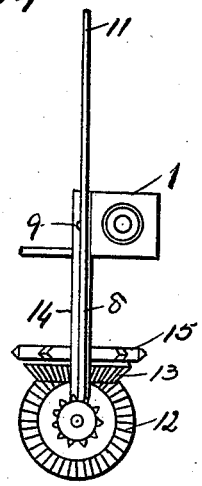
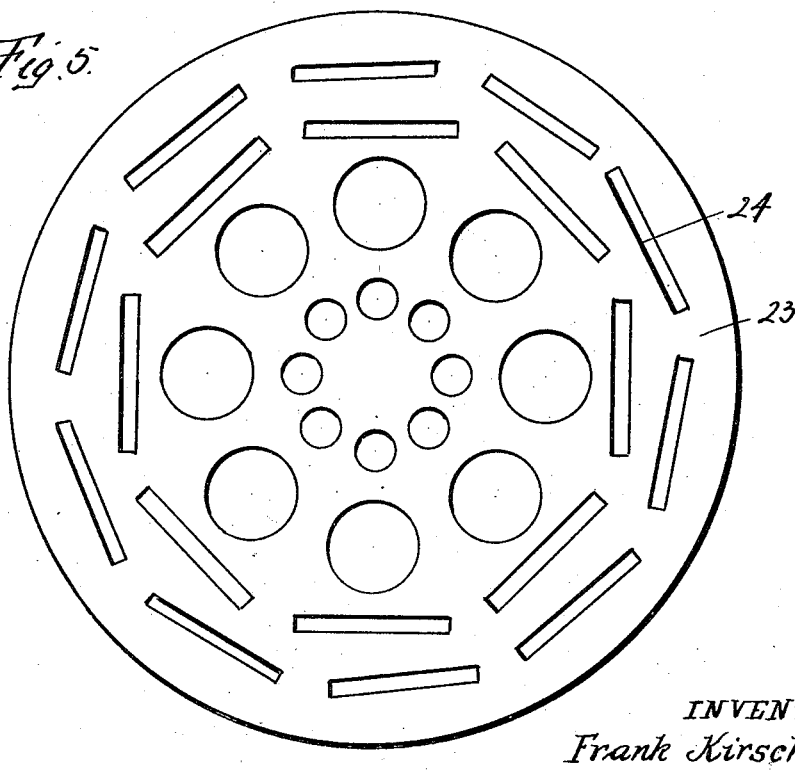
INVENTOR
Frank Kirschke
By W. W. Williamson
Atty.

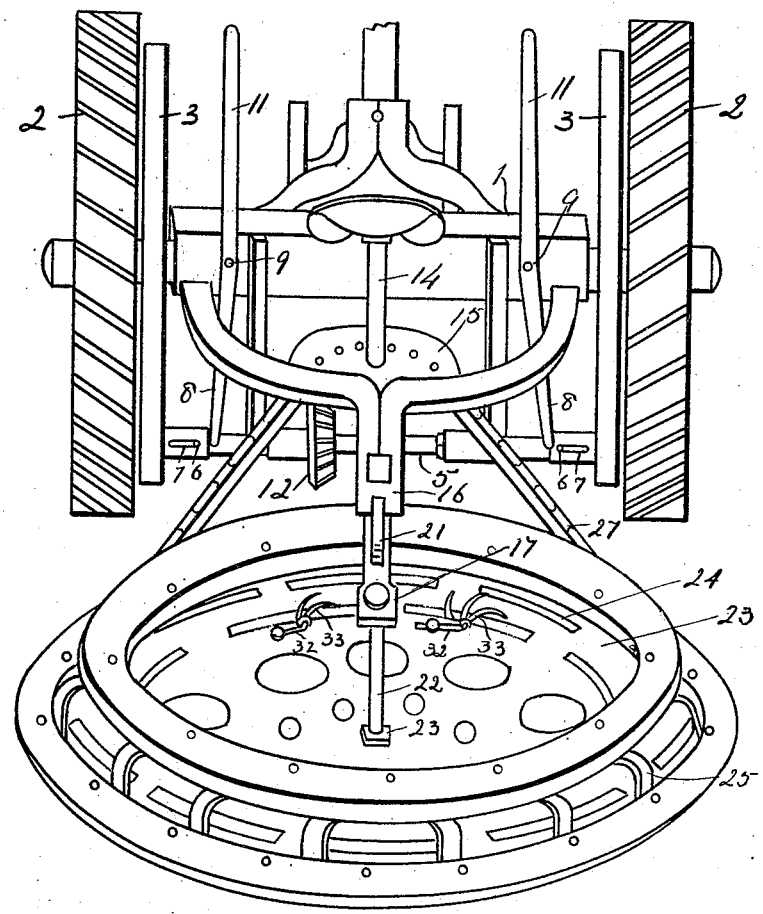

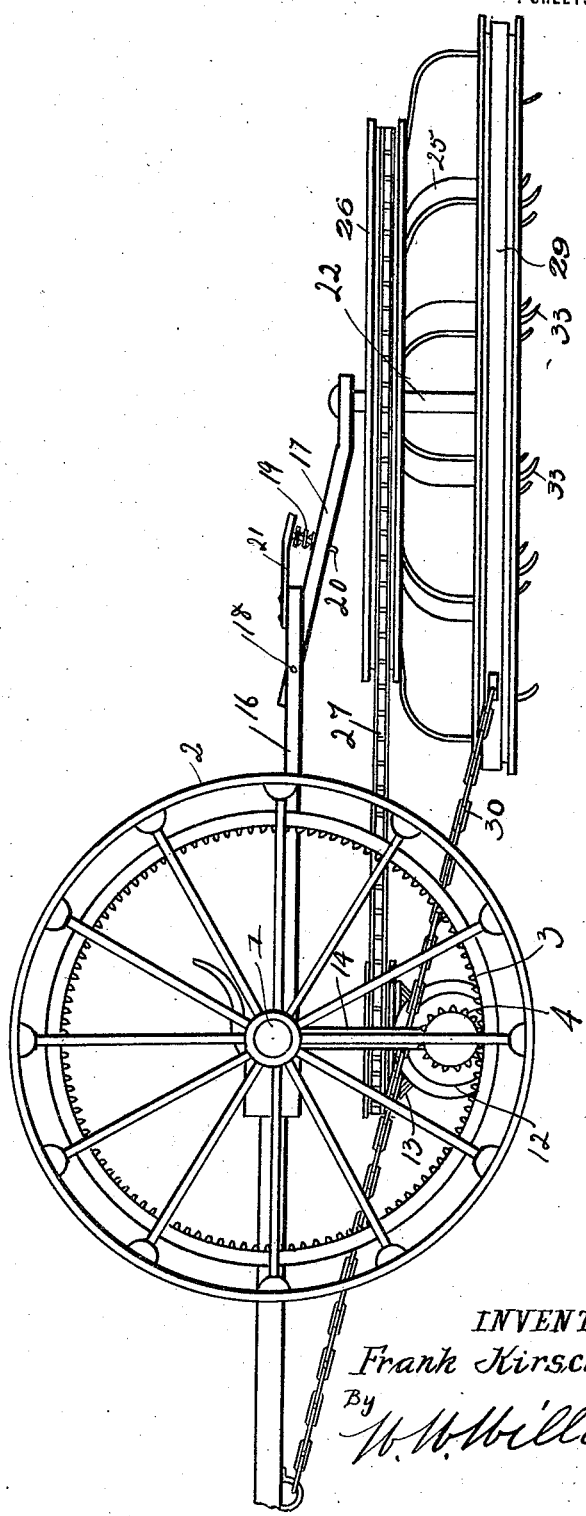

F. KIRSCHKE.
ROTARY HARROW.
APPLICATION FILED APR. 23, 1920.
1,418,933.
Patented June 6, 1922.
4 SHEETS—SHEET 4.
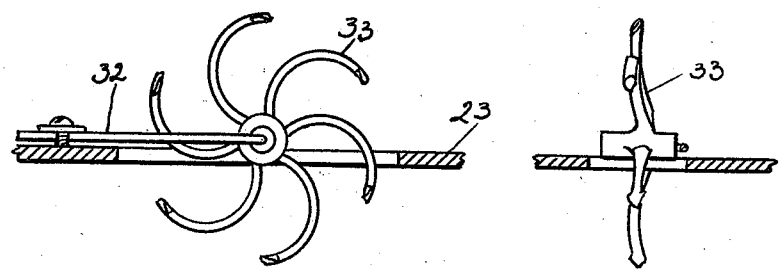
Fig 6.
Fig 7.
Fig 8.
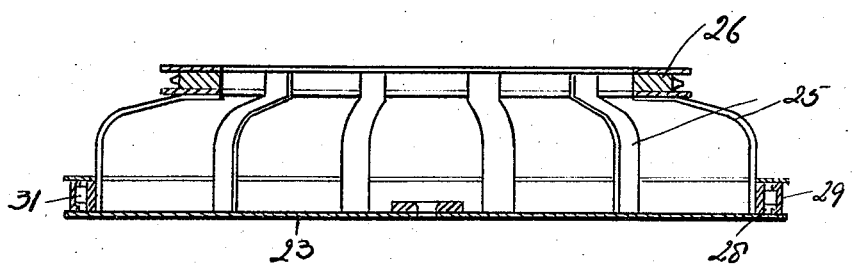
INVENTOR.
Frank Kirschke
By W. W. Williamson
Atty.

UNITED STATES PATENT OFFICE.

FRANK KIRSCHKE, OF PHILADELPHIA, PENNSYLVANIA.

ROTARY HARROW.

1,418,933. Specification of Letters Patent. Patented June 6, 1922.

Application filed April 23, 1920. Serial No. 375,925.

*To all whom it may concern:*

Be it known that I, FRANK KIRSCHKE, a citizen of the United States, residing at Philadelphia, in the county of Philadelphia and State of Pennsylvania, have invented new and useful Improvements in Rotary Harrows, of which the following is a specification.

My invention relates to new and useful improvements in rotary harrows, and has for its object to so construct a harrow of this description that when it is drawn over the ground a turn table carrying a series of toothed wheels will be revolved, the teeth of said wheels digging into and breaking up the previously plowed ground in such manner as to thoroughy disintegrate the soil.

A further object of the invention is to provide for the levelling of the soil after it has been disintegrated.

A still further object of the invention is to provide for the harrow being embodied with and operated either by a tractor or horse drawn vehicle.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Fig. 1, is a perspective of my improvement looking toward the rear of the machine.

Fig. 2, is a side elevation.

Fig. 3, is a rear elevation of the tractor or other vehicle with which my improved harrow is embodied showing the driving mechanism for revolving thereon.

Fig. 4, is a side view of a portion of Fig. 3.

Fig. 5, is a plan view of the turn table, the disintegrating wheels being omitted.

Fig. 6, is an enlarged section of a portion of the turn table showing one of the disintegrating wheels.

Fig. 7, is a view at right angles to Fig. 6.

Fig. 8, is a central section of the harrow member proper.

In carrying out my invention as here embodied, 1 represents the rear axle of a tractor or other vehicle mounted upon the traction wheels 2, each of which traction wheels carries an internal gear 3 which meshes with one of the pinions 4 mounted upon the shaft 5 and caused to rotate therewith by the pin 6 projecting through the slot 7 formed in the shank of the pinion.

8 represents two operating levers each of which is pivoted at 9 to the axle 1 and has its lower end so forked as to engage with a groove 10 formed in the shank of one of the pinions 4 the upper end of each of these levers terminating in a hand hold 11 by means of which the operator may throw either one or the other of the pinions 4 into or out of mesh with its corresponding gear 3 for the purpose hereinafter set forth.

A bevel gear 12 is secured upon the shaft 5 and meshes with a bevel gear 13 journalled on a depended stationary shaft 14 carried by the axle 1 and to the bevel gear 13 is attached a sprocket wheel 15 also journalled on the shaft 14.

The axle 1 also carries a rearwardly projecting bracket 16 to which is pivoted an arm 17 as at 18, said arm being normally forced downward by a spring 19 coiled about a pin 20 carried by the extension member 21 which is secured to and projects from the bracket 16, said pin passing through the arm 17 with one end of the spring engaging said arm as the movable element and the other end engaging the extension member as the stationary element. The free end of the arm 17 carries an upright 22 on the lower end of which is journalled the turn table 23 in the form of a metallic disc having lightening holes and provided with a plurality of slots 24 and this turn table carries a frame work including the stays 25 which support a sprocket wheel 26 over which runs a chain 27, said chain also passing around the sprocket wheel 15 so that a rotary motion is transmitted to the turn table when the traction wheels 2 are revolved and the pinions 4 are in mesh with the inturned gears 3 as will be obvious. The frame work is provided with an external channel 28 formed in any suitable manner and in this channel is located a hoop 29 which is of such size as to permit the framework and turn table to freely revolve within said hoop, the latter being held stationary and attached to the tractor or other vehicle by means of the drag chains 30 and in order to reduce the friction to a minimum, I employ suitable roller bearings 31 located between the hoop and the walls of the channel.

On the turn table in the region of the slots 24 are mounted the resilient axle supporting members 32 which carry the axles of the disintegrating wheels 33, said disintegrating wheels being mounted upon the axle so as to freely revolve thereon and projecting through the slots 24 so as to extend beyond the lower face of the disc or turn table 23. These disintegrating wheels have a number of arcuate teeth or prongs which when the device is in use will dig into the soil and disintegrate it or thoroughly break it up to accomplish what is known as harrowing in preparing the soil for planting.

In practice the harrow is drawn over the ground and if the pinions 4 are in mesh with the internal gears 3 carried by the traction wheels 2 power will be transmitted from said traction wheels through the internal gears and pinions to the shaft 5 and thence through the bevel gears 12 and 13, the sprocket wheel 15 and chain 27 to the sprocket wheel 26, and as said sprocket wheel is supported by the frame work carried by the turn table 23, said turn table will be revolved as it passes over the ground and since the weight of this turn table with its frame and other appurtenances is resting upon the ground the disintegrating wheels 23 will be caused to dig into the soil and the movement of the turn table will cause said wheels to revolve thus digging up, turning over and breaking the soil up into small particles after which it will be smoothed down by the outer surface of the turn table. This turn table is dragged along by means of the drag chains 30 the ends of which are attached to the hoop 29 to permit the revolving of said turn table the harrow proper being held in an upright position by means of the shaft 22 carried by the arm 17 which is pivoted in the bracket 16.

When it is necessary to turn to one side or to turn around one of the levers 11 is thrown in that direction that will withdraw its pinion from the cooperating internal gear and when the turning has been completed the lever is released and the pinion will be again forced into mesh with its internal gear by means of a spring 34.

Of course I do not wish to be limited to the exact details of construction as herein shown as these may be varied within the limits of the appended claims without departing from the spirit of my invention.

Having thus fully described my invention, what I claim as new and useful is:—

1. A rotary harrow comprising a turn table, a plurality of disintegrating wheels revolubly mounted upon the turn table and means revolving said turn table.

2. A rotary harrow comprising a rotatable turn table having slots therein, means for rotating said turn table, and toothed disintegrating wheels mounted on said turn table and projecting through said slots.

3. A rotary harrow comprising a turn table having a plurality of slots therein, a frame carried by said turn table, a channel around said frame, a hoop within said channel and within which the turn table and frame are revoluble, means connected with the hoop for dragging the harrow, means for revolving the turn table and toothed disintegrating wheels resiliently mounted on the turn table and projecting through the slots therein.

4. In a device of the character stated, the combination of an axle, traction wheels on said axle, a bracket carried by the axle and projecting rearwardly therefrom, an arm pivoted to said bracket, means for normally forcing the outer end of said arm outward, an upright supported by said arm, a turn table journalled on said upright, said turn table having slots therein, a frame carried by said turn table, means for transmitting motion from the traction wheels to the turn table, resilient axle supporting means carried by the turn table located adjacent each slot, disintegrating wheels projecting in the turn table, the axles of said wheels being supported by the resilient means, a channel surrounding the frame work of the turn table, a hoop located within said channel, roller bearings between the hoop and walls of the channel and drag chains attached to the hoop and the vehicle formed by the traction wheels and their axle.

In testimony whereof, I have hereunto affixed my signature.

FRANK KIRSCHKE.